No. 679,929. Patented Aug. 6, 1901.
E. C. WEBSTER.
RATCHET WRENCH.
(Application filed Aug. 24, 1900.)
(No Model.)
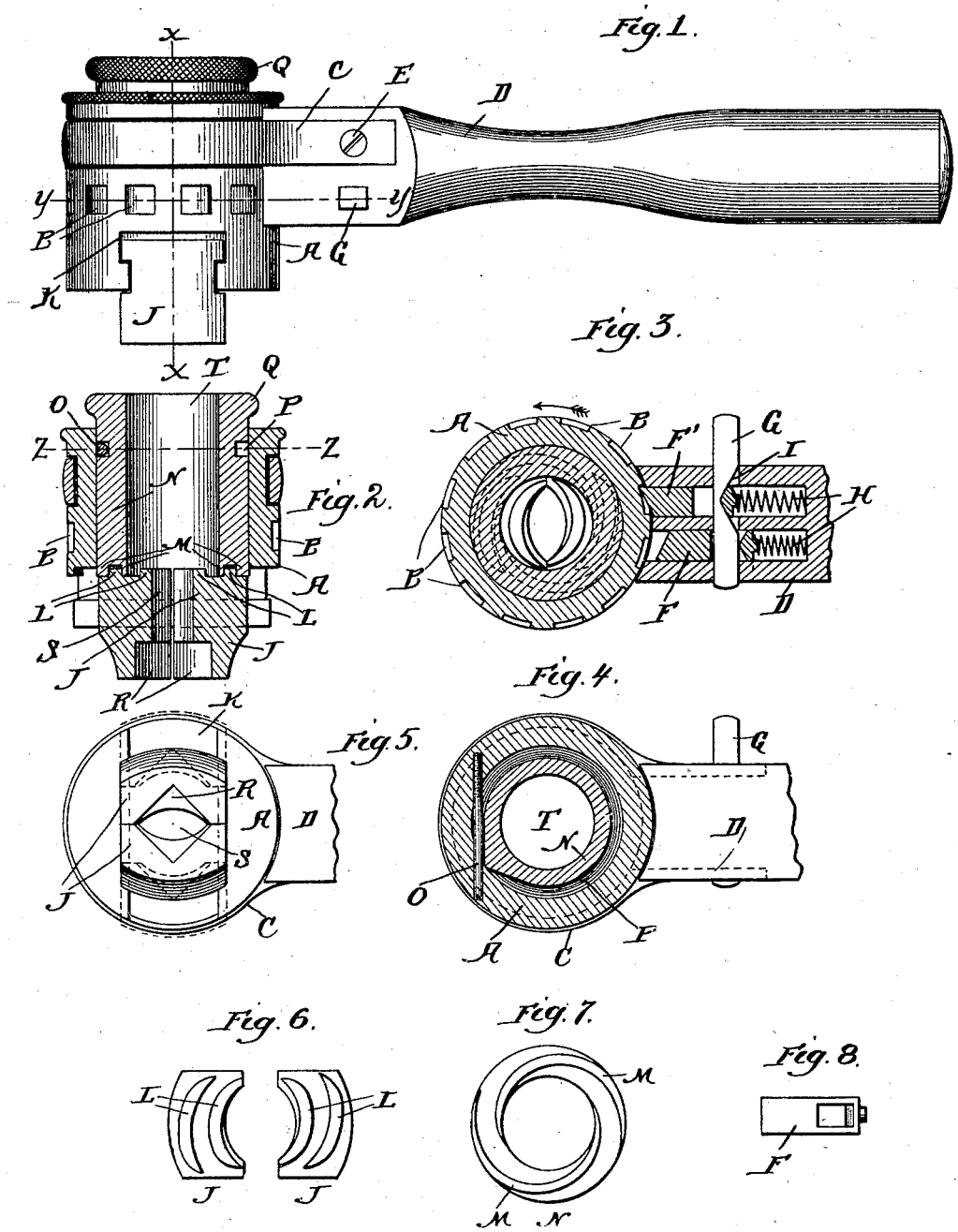
Witnesses:
H. B. Hallock.
L. H. Morrison
Inventor.
Edward. C. Webster

UNITED STATES PATENT OFFICE.

EDWARD C. WEBSTER, OF EAST SHOREHAM, VERMONT.

RATCHET-WRENCH.

SPECIFICATION forming part of Letters Patent No. 679,929, dated August 6, 1901.

Application filed August 24, 1900. Serial No. 27,877. (No model.)

*To all whom it may concern:*

Be it known that I, EDWARD C. WEBSTER, a citizen of the United States, residing at East Shoreham, county of Addison, and State of Vermont, have invented a certain new and useful Improvement in Ratchet-Wrenches, of which the following is a specification.

My invention relates to a new and useful improvement in ratchet-wrenches and chucks, and has for its object to provide an exceedingly simple and effective device of this description which will take a firm grasp upon any object, whether it be round, square, or polygonal, and permit the same to be turned in either direction, as the case may be.

With this end in view the invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side view of my improved wrench and chuck; Fig. 2, a section at the line $x$ $x$ of Fig. 1; Fig. 3, a section at the line $y$ $y$ of Fig. 1; Fig. 4, a section at the line $z$ $z$ of Fig. 2; Fig. 5, a bottom plan showing the under face of the chuck; Fig. 6, a detail view of the upper faces of the chuck-jaws, showing the threads thereon for their operation; Fig. 7, a view of the lower face of the operating-barrel, showing the threads thereon for engagement with the threads upon the chuck-jaws; and Fig. 8, a detail edge view of one of the pawls for operating the ratchet.

In carrying out my invention as here embodied, A is the head of the device, which is cylindrical in shape and has a series of notches B formed therein which serve as a ratchet. Around this head is formed a groove in which fits the strap C, and this strap may be, if desired, of sufficient width to cover the ratchet formed by the teeth B and is secured to the handle D by suitable screws E. The forward portion of the handle has recesses formed therein in which are fitted the pawls F and F', each of which is slotted and has passed therethrough the shifting pin G, the ends of which project beyond the sides of the handle, as clearly shown. Springs H are fitted behind the pawls, so as to give them a tendency to move inward toward the ratchet, and they are held against this inward movement by the pin G when in proper position for that purpose. The pin G has a V-shaped notch I formed therein, and when this notch registers with the beveled rear wall of one of the pawls that particular pawl will be permitted to move forward by the action of its spring until its nose is in engagement with the teeth of the ratchet, as clearly shown in Fig. 3, in connection with the pawl F'. When this pawl is in this position, it is obvious that the oscillation of the handle will cause the head to be ratcheted in the direction of the arrow; but by forcing the pin crosswise until the notch I registers with the beveled wall of the pawl F this last-named pawl will be thrown into action, while the pawl F' will be retracted and held out of action. Now any oscillation of the handle will ratchet the head in the opposite direction from the arrow, as will be readily understood. When it is desired to throw both of the pawls out of action, the shifting pin G is moved until its ends project equally beyond the sides of the handle, in which position the notch I will not register with either of the beveled walls of the pawls F or F', and therefore both of said pawls will be held retractive against their springs. This will permit the handle to revolve freely around the head or the head to revolve within the strap.

The chuck for this ratchet-wrench consists of the two jaws J, which are fitted to slide in the T-shaped slots K, so as to slide diametrically across the head, and the upper faces of these jaws have formed thereon the sectional threads L, adapted to engage the threads M, formed upon the lower face of the barrel N, the latter being fitted within the head, so as to readily turn upon its axis, and is held against retraction by the screw-pin O, fitting within the annular groove P, formed in said barrel. From this it will be seen that when the barrel is turned the jaws will be moved in one direction or the other, as the case may be, and thereby opened or closed for grasping or releasing any object.

For convenience in manipulating the barrel a knurled bead Q is formed around the top thereof and may be readily grasped by the fingers with sufficient pressure to clamp the jaws tightly upon the edge to be turned. This arrangement avoids the necessity of having to use a wrench or key for the operation of the pawls of the chuck.

The lower portion of the jaws are V-shaped, as indicated at R, and thereby especially adapted for grasping square or polygonal shaped bolt-heads or nuts, while the remaining inner surfaces of the jaws are curved, as indicated at S, and are thus especially adapted for holding round articles, such as drill-shanks and the like. The barrel has an opening T through and through, so as to permit the passage of the article being held by the chuck, and this in some cases is of great importance, since it permits the insertion or removal of any article from the upper side of the device or it permits the chuck to be used in connection with long rods.

Of course I do not wish to be limited to the exact details of construction here shown, as these may be varied within certain limits without departing from the spirit of my invention.

Having thus fully described my invention, what I claim as new and useful is—

1. A ratchet and chuck consisting of a cylindrical head, ratchet-teeth formed around the periphery thereof, a strap embracing the head so as to permit the latter to revolve, a handle to which the strap is secured, two spring-actuated pawls fitted within suitable recesses in the handle, a shifting pin having a notch therein adapted to throw one or both of the pawls into or out of engagement, two jaws fitted in the head to slide diametrically across said head, a barrel secured within the head so as to revolve upon its axis, threads formed upon the lower face of the barrel, and screw-threads formed upon the upper faces of the jaws, said threads engaging each other, as and for the purpose set forth.

2. In combination, a cylindrical head, ratchet-teeth formed around said head, a strap embracing the head while permitting it to revolve, a handle having recesses therein to which said strap is secured, the inner end of said handle completing the circle of the strap, two pawls fitted in the recesses of the handle, springs arranged back of the pawls so as to give them an outward tendency, a shifting pin having a V-shaped notch therein, said pin being adapted to slide crosswise through the handle and the pawls, whereby either of the pawls may be thrown into action or one or both thereof thrown out of action, as specified.

3. In combination with a ratchet-head of a device of the character described, two jaws fitted to slide within the head, threads formed upon the upper faces of the jaws, a barrel adapted to revolve within the head, threads formed upon the lower face of the barrel and engaging with the first-named threads, whereby the revolving of the barrel will open or close the jaws, a pin secured in the ratchet-head, said pin adapted to lie within an annular groove formed around the periphery of the barrel for the purpose of allowing the barrel to revolve, and at the same time preventing any longitudinal movement of the same, a projection formed in the groove and adapted to abut against the pin for the purpose of limiting the movement of the barrel in either direction, as and for the purpose specified.

In testimony whereof I have hereunto affixed my signature in the presence of two subscribing witnesses.

EDWARD C. WEBSTER.

Witnesses:
CHARLOTTE D. HOWARD,
FLORENCE A. HOWARD.